United States Patent
Sako et al.

(10) Patent No.: US 7,272,098 B2
(45) Date of Patent: Sep. 18, 2007

(54) DATA RECORDING APPARATUS AND ASSOCIATED METHODOLOGY OF AFFECTING A DIGITAL SUM VARIANCE

(75) Inventors: Yoichiro Sako, Tokyo (JP); Tatsuya Inokuchi, Tokyo (JP); Shunsuke Furukawa, Tokyo (JP); Takashi Kihara, Chiba (JP); Toru Aida, Kanagawa (JP); Akiya Saito, Kanagawa (JP); Yoriaki Kanada, Kanagawa (JP); Tatsushi Sano, Kanagawa (JP); Yoshiro Miyoshi, Kanagawa (JP); Toshihiko Senno, Kanagawa (JP); Yoshinobu Usui, Kanagawa (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 827 days.

(21) Appl. No.: 10/436,059

(22) Filed: May 13, 2003

(65) Prior Publication Data

US 2004/0037201 A1    Feb. 26, 2004

(30) Foreign Application Priority Data

May 29, 2002   (JP)   ............................. 2002-156045

(51) Int. Cl.
    *G11B 20/10*   (2006.01)

(52) U.S. Cl. .................................................. 369/59.24
(58) Field of Classification Search .................... None
    See application file for complete search history.

(56) References Cited

U.S. PATENT DOCUMENTS 4,729,043 A * 3/1988 Worth ......................... 386/116

OTHER PUBLICATIONS

U.S. Appl. No. 10/436,059, filed May 13, 2003, Sako et al.
U.S. Appl. No. 10/481,886, filed Jan. 2, 2004, Sako et al.
U.S. Appl. No. 10/483,261, filed Jan. 14, 2004, Sako et al.
U.S. Appl. No. 10/483,622, filed Jan. 14, 2004, Sako et al.

* cited by examiner

*Primary Examiner*—Paul W. Huber
(74) *Attorney, Agent, or Firm*—Oblon, Spivak, McClelland, Maier & Neustadt, P.C.

(57) ABSTRACT

A recording method includes the steps of generating recording data in such a manner that, when m-bit data is converted into a data symbol of n bits (m<n), and connection bits such that the summed value of DC components per unit time decreases are selected from among a plurality of connection bits and are added after the m-bit data symbol, the connection bits differing from connection bits which are added when the n-bit data symbol is a data symbol other than the special data symbol are added to generate recording data; and recording the generated recording data on a recording medium.

17 Claims, 16 Drawing Sheets

FIG. 8

| HEXA-DECIMAL | DECIMAL | DATA SYMBOL d1.........d8 | CODE SYMBOL C1.............C14 |
|---|---|---|---|
| 00h | 000 | 00000000 | 01001000100000 |
| 01h | 001 | 00000001 | 10000100000000 |
| 02h | 002 | 00000010 | 10010000100000 |
| 03h | 003 | 00000011 | 10001000100000 |
| 04h | 004 | 00000100 | 01000100000000 |
| 05h | 005 | 00000101 | 00000100010000 |
| 06h | 006 | 00000110 | 00010000100000 |
| 07h | 007 | 00000111 | 00100100000000 |
| 08h | 008 | 00001000 | 01001001000000 |
| 09h | 009 | 00001001 | 10000001000000 |
| 0Ah | 010 | 00001010 | 10010001000000 |
| 0Bh | 011 | 00001011 | 10001001000000 |
| 0Ch | 012 | 00001100 | 01000001000000 |
| 0Dh | 013 | 00001101 | 00000001000000 |
| 0Eh | 014 | 00001110 | 00010001000000 |
| 0Fh | 015 | 00001111 | 00100001000000 |
| 10h | 016 | 00010000 | 10000000100000 |
| 11h | 017 | 00010001 | 10000010000000 |
| 12h | 018 | 00010010 | 10010010000000 |
| 13h | 019 | 00010011 | 00100000100000 |
| 14h | 020 | 00010100 | 01000010000000 |
| 15h | 021 | 00010101 | 00000010000000 |
| 16h | 022 | 00010110 | 00010010000000 |
| 17h | 023 | 00010111 | 00100010000000 |
| 18h | 024 | 00011000 | 01001000010000 |
| 19h | 025 | 00011001 | 10000000010000 |
| 1Ah | 026 | 00011010 | 10010000010000 |
| 1Bh | 027 | 00011011 | 10001000010000 |
| 1Ch | 028 | 00011100 | 01000000010000 |
| 1Dh | 029 | 00011101 | 00001000010000 |
| 1Eh | 030 | 00011110 | 00010000010000 |
| 1Fh | 031 | 00011111 | 00100000010000 |
| 20h | 032 | 00100000 | 00000000100000 |
| 21h | 033 | 00100001 | 10000100001000 |
| 22h | 034 | 00100010 | 00001000100000 |
| 23h | 035 | 00100011 | 00100100100000 |
| 24h | 036 | 00100100 | 01000100001000 |
| 25h | 037 | 00100101 | 00000100001000 |
| 26h | 038 | 00100110 | 01000000100000 |
| 27h | 039 | 00100111 | 00100100001000 |
| 28h | 040 | 00101000 | 01001001001000 |
| 29h | 041 | 00101001 | 10000001001000 |
| 2Ah | 042 | 00101010 | 10010001001000 |
| 2Bh | 043 | 00101011 | 10001001001000 |
| 2Ch | 044 | 00101100 | 01000001001000 |
| 2Dh | 045 | 00101101 | 00000001001000 |
| 2Eh | 046 | 00101110 | 00010001001000 |
| 2Fh | 047 | 00101111 | 00100001001000 |

FIG. 9

| HEXA-DECIMAL | DECIMAL | DATA SYMBOL | CODE SYMBOL |
|---|---|---|---|
| 30h | 048 | 00110000 | 00000100000000 |
| 31h | 049 | 00110001 | 10000010001000 |
| 32h | 050 | 00110010 | 10010010001000 |
| 33h | 051 | 00110011 | 10000100010000 |
| 34h | 052 | 00110100 | 01000010001000 |
| 35h | 053 | 00110101 | 00000010001000 |
| 36h | 054 | 00110110 | 00010010001000 |
| 37h | 055 | 00110111 | 00100010001000 |
| 38h | 056 | 00111000 | 01001000001000 |
| 39h | 057 | 00111001 | 10000000001000 |
| 3Ah | 058 | 00111010 | 10010000001000 |
| 3Bh | 059 | 00111011 | 10001000001000 |
| 3Ch | 060 | 00111100 | 01000000001000 |
| 3Dh | 061 | 00111101 | 00001000001000 |
| 3Eh | 062 | 00111110 | 00010000001000 |
| 3Fh | 063 | 00111111 | 00100000001000 |
| 40h | 064 | 01000000 | 01001000100100 |
| 41h | 065 | 01000001 | 10000100100100 |
| 42h | 066 | 01000010 | 10010000100100 |
| 43h | 067 | 01000011 | 10001000100100 |
| 44h | 068 | 01000100 | 01000100100100 |
| 45h | 069 | 01000101 | 00000000100100 |
| 46h | 070 | 01000110 | 00010000100100 |
| 47h | 071 | 01000111 | 00100100100100 |
| 48h | 072 | 01001000 | 01001001000100 |
| 49h | 073 | 01001001 | 10000001000100 |
| 4Ah | 074 | 01001010 | 10010001000100 |
| 4Bh | 075 | 01001011 | 10001001000100 |
| 4Ch | 076 | 01001100 | 01000001000100 |
| 4Dh | 077 | 01001101 | 00000001000100 |
| 4Eh | 078 | 01001110 | 00010001000100 |
| 4Fh | 079 | 01001111 | 00100001000100 |
| 50h | 080 | 01010000 | 10000000100100 |
| 51h | 081 | 01010001 | 10000010000100 |
| 52h | 082 | 01010010 | 10010010000100 |
| 53h | 083 | 01010011 | 00100000100100 |
| 54h | 084 | 01010100 | 01000010000100 |
| 55h | 085 | 01010101 | 00000010000100 |
| 56h | 086 | 01010110 | 00010010000100 |
| 57h | 087 | 01010111 | 00100010000100 |
| 58h | 088 | 01011000 | 01001000000100 |
| 59h | 089 | 01011001 | 10000000000100 |
| 5Ah | 090 | 01011010 | 10010000000100 |
| 5Bh | 091 | 01011011 | 10001000000100 |
| 5Ch | 092 | 01011100 | 01000000000100 |
| 5Dh | 093 | 01011101 | 00001000000100 |
| 5Eh | 094 | 01011110 | 00010000000100 |
| 5Fh | 095 | 01011111 | 00100000000100 |
| 60h | 096 | 01100000 | 01001000100010 |
| 61h | 097 | 01100001 | 10000100100010 |

FIG. 10

| HEXA-DECIMAL | DECIMAL | DATA SYMBOL | CODE SYMBOL |
|---|---|---|---|
| 62h | 098 | 01100010 | 10010000100010 |
| 63h | 099 | 01100011 | 10001000100010 |
| 64h | 100 | 01100100 | 01000100100010 |
| 65h | 101 | 01100101 | 00000000100010 |
| 66h | 102 | 01100110 | 01000000100100 |
| 67h | 103 | 01100111 | 00100100100010 |
| 68h | 104 | 01101000 | 01001001000010 |
| 69h | 105 | 01101001 | 10000001000010 |
| 6Ah | 106 | 01101010 | 10010001000010 |
| 6Bh | 107 | 01101011 | 10001001000010 |
| 6Ch | 108 | 01101100 | 01000001000010 |
| 6Dh | 109 | 01101101 | 00000001000010 |
| 6Eh | 110 | 01101110 | 00010001000010 |
| 6Fh | 111 | 01101111 | 00100001000010 |
| 70h | 112 | 01110000 | 10000000100010 |
| 71h | 113 | 01110001 | 10000010000010 |
| 72h | 114 | 01110010 | 10010010000010 |
| 73h | 115 | 01110011 | 00100000100010 |
| 74h | 116 | 01110100 | 01000010000010 |
| 75h | 117 | 01110101 | 00000010000010 |
| 76h | 118 | 01110110 | 00010010000010 |
| 77h | 119 | 01110111 | 00100010000010 |
| 78h | 120 | 01111000 | 01001000000010 |
| 79h | 121 | 01111001 | 00001001001000 |
| 7Ah | 122 | 01111010 | 10010000000010 |
| 7Bh | 123 | 01111011 | 10001000000010 |
| 7Ch | 124 | 01111100 | 01000000000010 |
| 7Dh | 125 | 01111101 | 00001000000010 |
| 7Eh | 126 | 01111110 | 00010000000010 |
| 7Fh | 127 | 01111111 | 00100000000010 |
| 80h | 128 | 10000000 | 01001000100001 |
| 81h | 129 | 10000001 | 10000100100001 |
| 82h | 130 | 10000010 | 10010000100001 |
| 83h | 131 | 10000011 | 10001000100001 |
| 84h | 132 | 10000100 | 01000100100001 |
| 85h | 133 | 10000101 | 00000000100001 |
| 86h | 134 | 10000110 | 00010000100001 |
| 87h | 135 | 10000111 | 00100100100001 |
| 88h | 136 | 10001000 | 01001001000001 |
| 89h | 137 | 10001001 | 10000001000001 |
| 8Ah | 138 | 10001010 | 10010001000001 |
| 8Bh | 139 | 10001011 | 10001001000001 |
| 8Ch | 140 | 10001100 | 01000001000001 |
| 8Dh | 141 | 10001101 | 00000001000001 |
| 8Eh | 142 | 10001110 | 00010001000001 |
| 8Fh | 143 | 10001111 | 00100001000001 |
| 90h | 144 | 10010000 | 10000000100001 |
| 91h | 145 | 10010001 | 10000010000001 |
| 92h | 146 | 10010010 | 10010010000001 |
| 93h | 147 | 10010011 | 00100000100001 |

FIG. 11

| HEXA-DECIMAL | DECIMAL | DATA SYMBOL | CODE SYMBOL |
|---|---|---|---|
| 94h | 148 | 10010100 | 01000010000001 |
| 95h | 149 | 10010101 | 00000010000001 |
| 96h | 150 | 10010110 | 00010010000001 |
| 97h | 151 | 10010111 | 00100010000001 |
| 98h | 152 | 10011000 | 01001000000001 |
| 99h | 153 | 10011001 | 10000010010000 |
| 9Ah | 154 | 10011010 | 10010000000001 |
| 9Bh | 155 | 10011011 | 10001000000001 |
| 9Ch | 156 | 10011100 | 01000010010000 |
| 9Dh | 157 | 10011101 | 00001000000001 |
| 9Eh | 158 | 10011110 | 00010000000001 |
| 9Fh | 159 | 10011111 | 00100010010000 |
| A0h | 160 | 10100000 | 00001000100001 |
| A1h | 161 | 10100001 | 10000100001001 |
| A2h | 162 | 10100010 | 01000100010000 |
| A3h | 163 | 10100011 | 00000100100001 |
| A4h | 164 | 10100100 | 01000100001001 |
| A5h | 165 | 10100101 | 00000100001001 |
| A6h | 166 | 10100110 | 01000000100001 |
| A7h | 167 | 10100111 | 00100100001001 |
| A8h | 168 | 10101000 | 01001001001001 |
| A9h | 169 | 10101001 | 10000001001001 |
| AAh | 170 | 10101010 | 10010001001001 |
| ABh | 171 | 10101011 | 10001001001001 |
| ACh | 172 | 10101100 | 01000001001001 |
| ADh | 173 | 10101101 | 00000001001001 |
| AEh | 174 | 10101110 | 00010001001001 |
| AFh | 175 | 10101111 | 00100001001001 |
| B0h | 176 | 10110000 | 00000100100000 |
| B1h | 177 | 10110001 | 10000010001001 |
| B2h | 178 | 10110010 | 10010010001001 |
| B3h | 179 | 10110011 | 00100100010000 |
| B4h | 180 | 10110100 | 01000010001001 |
| B5h | 181 | 10110101 | 00000010001001 |
| B6h | 182 | 10110110 | 00010010001001 |
| B7h | 183 | 10110111 | 00100010001001 |
| B8h | 184 | 10111000 | 01001000001001 |
| B9h | 185 | 10111001 | 10000000001001 |
| BAh | 186 | 10111010 | 10010000001001 |
| BBh | 187 | 10111011 | 10001000001001 |
| BCh | 188 | 10111100 | 01000000001001 |
| BDh | 189 | 10111101 | 00001000001001 |
| BEh | 190 | 10111110 | 00010000001001 |
| BFh | 191 | 10111111 | 00100000001001 |
| C0h | 192 | 11000000 | 01000100100000 |
| C1h | 193 | 11000001 | 10000100010001 |
| C2h | 194 | 11000010 | 10010010010000 |
| C3h | 195 | 11000011 | 00001000100100 |
| C4h | 196 | 11000100 | 01000100010001 |
| C5h | 197 | 11000101 | 00000100010001 |

FIG. 12

| HEXA-DECIMAL | DECIMAL | DATA SYMBOL | CODE SYMBOL |
|---|---|---|---|
| C6h | 198 | 11000110 | 00010010010000 |
| C7h | 199 | 11000111 | 00100100010001 |
| C8h | 200 | 11001000 | 00001001000001 |
| C9h | 201 | 11001001 | 10000100000001 |
| CAh | 202 | 11001010 | 00001001000100 |
| CBh | 203 | 11001011 | 00001001000000 |
| CCh | 204 | 11001100 | 01000100000001 |
| CDh | 205 | 11001101 | 00000100000001 |
| CEh | 206 | 11001110 | 00000010010000 |
| CFh | 207 | 11001111 | 00100100000001 |
| D0h | 208 | 11010000 | 00000100100100 |
| D1h | 209 | 11010001 | 10000010010001 |
| D2h | 210 | 11010010 | 10010010010001 |
| D3h | 211 | 11010011 | 10000100100000 |
| D4h | 212 | 11010100 | 01000010010001 |
| D5h | 213 | 11010101 | 00000010010001 |
| D6h | 214 | 11010110 | 00010010010001 |
| D7h | 215 | 11010111 | 00100010010001 |
| D8h | 216 | 11011000 | 01001000010001 |
| D9h | 217 | 11011001 | 10000000010001 |
| DAh | 218 | 11011010 | 10010000010001 |
| DBh | 219 | 11011011 | 10001000010001 |
| DCh | 220 | 11011100 | 01000000010001 |
| DDh | 221 | 11011101 | 00001000010001 |
| DEh | 222 | 11011110 | 00010000010001 |
| DFh | 223 | 11011111 | 00100000010001 |
| E0h | 224 | 11100000 | 01000100000010 |
| E1h | 225 | 11100001 | 00000100000010 |
| E2h | 226 | 11100010 | 10000100010010 |
| E3h | 227 | 11100011 | 00100100000010 |
| E4h | 228 | 11100100 | 01000100010010 |
| E5h | 229 | 11100101 | 00000100010010 |
| E6h | 230 | 11100110 | 01000000100010 |
| E7h | 231 | 11100111 | 00100100010010 |
| E8h | 232 | 11101000 | 10000100000010 |
| E9h | 233 | 11101001 | 10000100000100 |
| EAh | 234 | 11101010 | 00001001001001 |
| EBh | 235 | 11101011 | 00001001000010 |
| ECh | 236 | 11101100 | 01000100000100 |
| EDh | 237 | 11101101 | 00000100000100 |
| EEh | 238 | 11101110 | 00010000100010 |
| EFh | 239 | 11101111 | 00100100000100 |
| F0h | 240 | 11110000 | 00000100100010 |
| F1h | 241 | 11110001 | 10000010010010 |
| F2h | 242 | 11110010 | 10010010010010 |
| F3h | 243 | 11110011 | 00001000100010 |
| F4h | 244 | 11110100 | 01000010010010 |
| F5h | 245 | 11110101 | 00000010010010 |
| F6h | 246 | 11110110 | 00010010010010 |
| F7h | 247 | 11110111 | 00100010010010 |

FIG. 13

| HEXA-DECIMAL | DECIMAL | DATA SYMBOL | CODE SYMBOL |
|---|---|---|---|
| F8h | 248 | 11111000 | 0100100010010 |
| F9h | 249 | 11111001 | 1000000010010 |
| FAh | 250 | 11111010 | 1001000010010 |
| FBh | 251 | 11111011 | 1000100010010 |
| FCh | 252 | 11111100 | 0100000010010 |
| FDh | 253 | 11111101 | 0000100010010 |
| FEh | 254 | 11111110 | 0001000010010 |
| FFh | 255 | 11111111 | 0010000010010 |

DATA RECORDING APPARATUS AND ASSOCIATED METHODOLOGY OF AFFECTING A DIGITAL SUM VARIANCE

BACKGROUND OF THE INVENTION

1. Field of the Invention

The present invention relates to a recording method, a recording apparatus, and a recording medium. More particularly, the present invention relates to a recording method for modulating data by a predetermined method and for recording the data, a recording apparatus for use therewith, and a recording medium therefor.

2. Description of the Related Art

Since optical discs such as CDs (Compact Disc) and CD-ROMs (Compact Disc Read Only Memory) can be easily handled and the manufacturing cost thereof is relatively low, these optical discs have been widely used as recording media for storing data. In recent years, CD-R (Compact Disc Recordable) discs that can additionally record data thereon and CD-RW (Compact Disc ReWritable) discs that can record and rewrite data thereon have appeared, and it has become easy to record data on such optical discs. Based on the above, optical discs in compliance with CD standard, such as CD-DA (Compact Disc-Digital Audio) discs, and CD-ROM discs, CD-R discs, CD-RW discs, etc., have become the core for data recording media. Furthermore, recently, audio data compression has been performed by MP3 (MPEG1 Audio Layer-3) or ATRAC3 (Advaptive TRansform Acoustic Coding), and the data is recorded on a CD-ROM disc, a CD-R disc, a CD-RW disc, etc.

However, with the appearance of CD-R discs and CD-RW discs, data recorded on these CD discs has become easy to copy. For this reason, the problem with the copyright protection has occurred, and there is a need to take measures for protecting content data when content data is to be recorded on CD discs.

FIG. 1 schematically shows the disc copying operation. A playback apparatus indicated at reference numeral 41 plays back an original disc, for example, a CD 42. Reference numeral 43 denotes an optical pickup, and reference numeral 44 denotes a playback signal processing section. Data recorded on the CD 42 is read by the optical pickup 43, and the playback signal processing section 44 performs signal processing on the signal output from the optical pickup 43 and outputs playback data. The playback data from the playback apparatus 41 is supplied to a recording processing section 52 of a recording apparatus 51, and an optical pickup 53 records the playback data on an optical disc, for example, a CD-R 54. The data recorded on the original CD 42 is copied onto the CD-R 54. In this manner, by using the playback apparatus 41 and the recording apparatus 51, a copied disc in which the data recorded on the original CD 42 is recorded can be easily created.

In the case of a CD, as shown in FIG. 2, in the playback processing section 44, a frame sync is detected by a sync detection section 46, from a playback signal from an input terminal 45, and EFM (Eight to Fourteenth Modulation) demodulation is performed by an EFM demodulator 47. Furthermore, the EFM-demodulated playback data is supplied to a CIRC (Cross Interleave Reed-Solomon Code) decoder 48, whereby error correction is performed on the EFM-demodulated playback data. In EFM, each symbol (8 data bits) is converted into 14 channel bits, and merge bits of 3 bits are added between two 14 channel bits. A subcode in the playback data is decoded by a subcode decoder 49, and a playback subcode is obtained.

FIG. 3 shows the overall configuration of a recording processing section 52. Data to be recorded is supplied from an input terminal 55 to a CIRC encoder 56, whereby the data undergoes the CIRC coding process. A subcode is supplied from an input terminal 57 to a subcode encoder 58, whereby the subcode is encoded. The output of the CIRC encoder 56 and the output of the subcode encoder 58 are supplied to a multiplexer 60. Furthermore, a frame sync is supplied from an input terminal 59 to the multiplexer 60. The multiplexer 60 causes these pieces of data to be arranged in a predetermined sequence, and the output of the multiplexer 60 is supplied to an EFM modulator 61, whereby the output undergoes an EFM modulation process.

One method for protecting content data recorded on the CD disc is to determine whether the disc is an original CD or is a disc copied from the original CD. For example, in the case of the original CD, copying is permitted, and in the case of a copied disc, further copying can be prohibited.

For the purpose of determining whether the disc is an original disc or a copied disc, a method has been proposed in which a defect is intentionally added in the data when a master is manufactured, and when the original disc is played back, that defect is detected from the data read from the disc in order to determine whether the disc is an original disc. However, this method has the problem in that, in spite of being the original disc, a defect may be contained in the data. Furthermore, depending on the type of defect, there is the problem in that the copying of the data read from the original disc into CD-R discs cannot be prevented.

SUMMARY OF THE INVENTION

It is an object of the present invention to provide a recording method which solves the above-mentioned problems.

It is another object of the present invention to provide a recording apparatus which solves the above-mentioned problems.

It is another object of the present invention to provide a recording medium which solves the above-mentioned problems.

According to the present invention, in one aspect, there is provided a recording method. The recording method includes the steps of: generating recording data in such a manner that, when m-bit data is converted into a data symbol of n bits (m<n), and connection bits such that the summed value of DC components per unit time decreases are selected from among a plurality of connection bits and are added after the m-bit data symbol, the connection bits such that the summed value of DC components increases when the n-bit data symbol is added to a data symbol other than the special data symbol are selected from among the plurality of connection bits and are added; and recording the generated recording data on a recording medium.

According to the present invention, in another aspect, there is provided a recording method. The recording method includes the steps of: generating recording data in such a manner that, when m-bit data is converted into n-bit data (m<n), the m-bit data is converted into data such that, when the n-bit data which precedes the above n-bit data is special data, the summed value of DC components per unit time increases when the n-bit data which succeeds the preceding n-bit data follows data other than the special data; and recording the generated recording data on a recording medium.

According to the present invention, in another aspect, there is provided a recording apparatus. The recording apparatus includes a generation section for generating recording data in such a manner that, when m-bit data is converted into n-bit data (m<n) and when the n-bit data which precedes the above n-bit data is special data, the m-bit data is converted into data such that the summed value of DC components per unit time increases when the n-bit data which succeeds the preceding n-bit data follows data other than the special data; and a recording section for recording the recording data generated by the generation section on a recording medium.

According to the present invention, in another aspect, there is provided a recording medium. The recording medium is formed such that, when m-bit data is converted into n-bit data (m<n), the m-bit data is converted into data such that, when the n-bit data which precedes the above n-bit data is special data, the summed value of DC components per unit time increases when the n-bit data which succeeds the preceding n-bit data follows data other than the special data, and the data is recorded and the recording medium.

BRIEF DESCRIPTION OF THE DRAWINGS

FIG. 8 shows an EFM conversion table;

FIG. 9 shows the EFM conversion table;

FIG. 10 shows the EFM conversion table;

FIG. 11 shows the EFM conversion table;

FIG. 12 shows the EFM conversion table;

FIG. 13 shows the EFM conversion table;

DESCRIPTION OF THE PREFERRED EMBODIMENTS

Preferred embodiments of the present invention will now be described below. The present invention provides a recording medium, such as a compact disc, in which a signal is recorded, which has a specific data pattern and such that, when a subcode is encoded in that data pattern portion by assuming the subcode to be a normal subcode (R to W channels=0), the summed value of DC components per unit time, that is, the summed value of the DSV (Digital Sum Variation), exceeds a predetermined range, and when the subcode is encoded by assuming the subcode to be a special subcode (R channel to W channel≠0) according to the present invention, the summed value of the DSV falls within a predetermined range. That is, a special subcode is added to the data of the above-described specific data pattern, and EFM is performed thereon. In the EFM, the summed value is output as a recording signal so that the summed value of the DSV falls within a predetermined range, and the disc is manufactured.

Since the disc manufactured in this manner is formed such that the summed value of the DSV does not exceed a predetermined range by a special subcode in a specific data pattern portion, playback can be performed without any problems. On the other hand, in a case in which the data recorded on this disc is copied onto a CD-R disc, etc., if the values of R to W channels of the subcode are replaced with 0, which is a value used as R to W channels of the normal subcode, the summed value of the DSV in a specific data pattern portion exceeds a predetermined range, and the playback operation fails, with the result that the copying of the CD is prevented.

Figure 1:
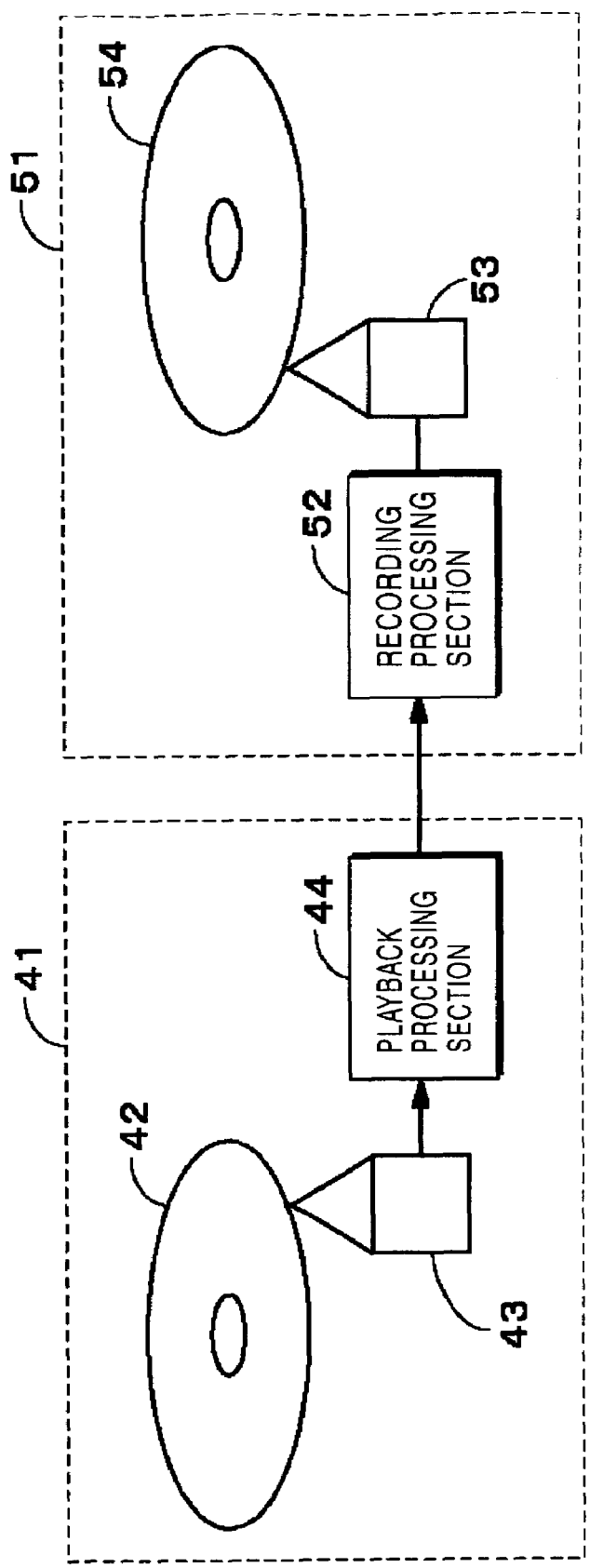
FIG. 1 is a block diagram illustrating the disc copying operation.
Figure 2:
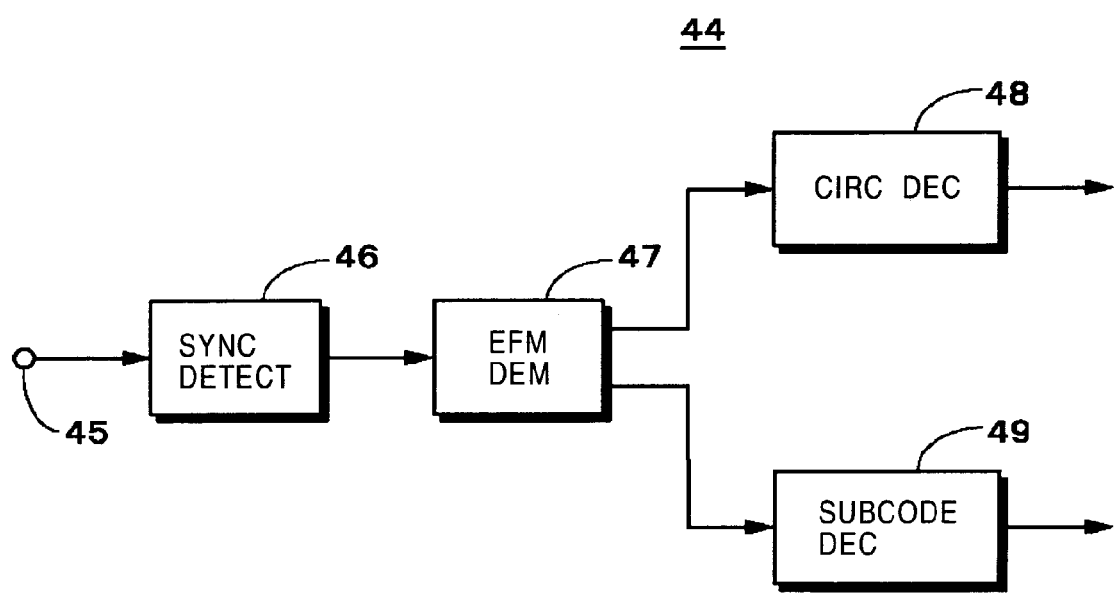
FIG. 2 is a block diagram showing the overview of a conventional playback processing section.
Figure 3:
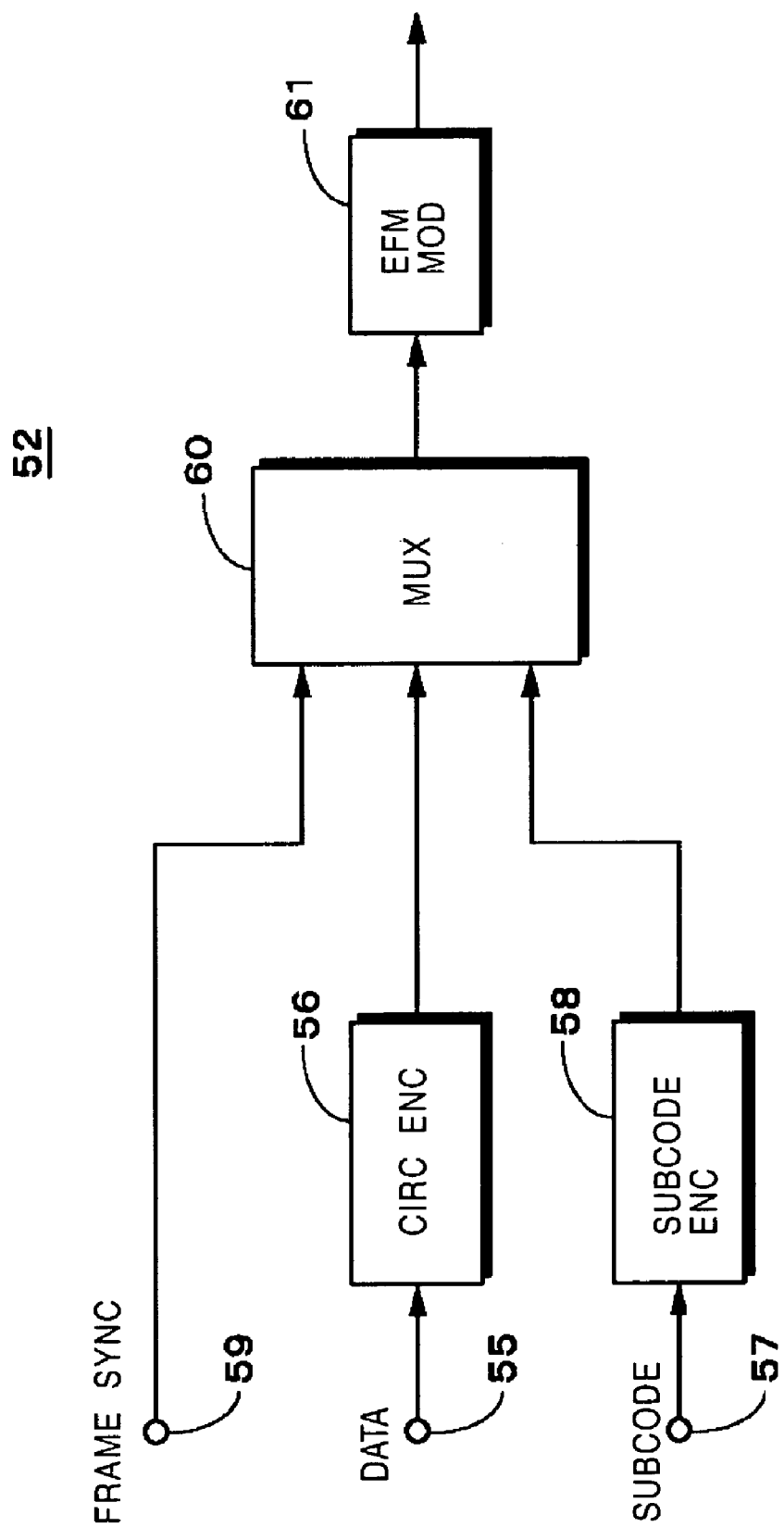
FIG. 3 is a block diagram showing the overview of a conventional recording processing section.
Figure 4:
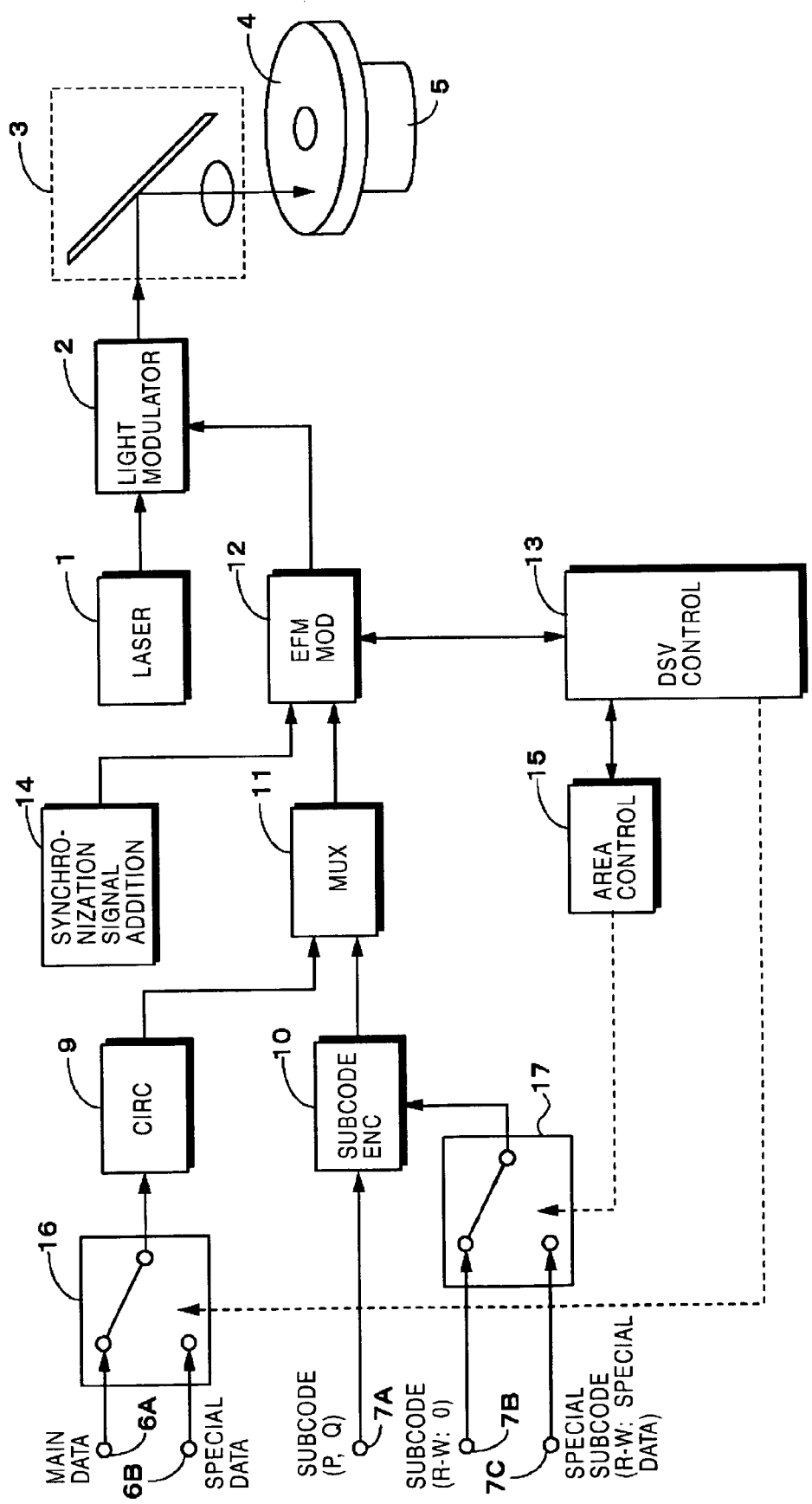
FIG. 4 is a block diagram showing an example of the configuration of a mastering apparatus for manufacturing data recording media according to the present invention.

FIG. 4 shows an example of the configuration of a mastering apparatus for manufacturing data recording media according to the present invention. The mastering apparatus includes a laser optical source 1, which is a gas laser such as an Ar ion laser, an He—Cd laser, or a Kr ion laser, or a semiconductor laser; an acousto-optical or electro-optical light modulator 2 for modulating laser light emitted from the laser optical source 1; and an optical pickup 3 having an objective lens for focusing the laser light transmitted through the light modulator 2 and for radiating the laser light onto the photoresist surface of a disc-shaped glass master 4 on which a photoresist, which is a photosensitive material, is coated.

The light modulator 2 modulates the laser light from the laser optical source 1 in accordance with a recording signal. In the mastering apparatus, a master in which data is recorded is manufactured by irradiating the glass master 4 with this modulated laser light. The light modulator 2 is provided with a servo section (not shown) for controlling the distance between the optical pickup 3 and the glass master 4 so as to be maintained constant and for controlling the rotational driving operation of a spindle motor 5. The glass master 4 is rotated by the spindle motor 5.

A recording signal from an EFM modulator 12 is supplied to the light modulator 2. Main digital data to be recorded is supplied from an input terminal 6A. The main digital data is, for example, digital audio data of 2-channel stereo. Special data, that is, data forming the above-described specific data pattern, is supplied from an input terminal 6B. The data supplied from the input terminals 6A and 6B is supplied to the corresponding input terminals of a switching circuit 16.

In the switching circuit 16, both of the terminals thereof are switched at a predetermined timing under the control of a DSV control section 13 (to be described later). The output of the switching circuit 16 is supplied to a CIRC (Cross Interleave Reed-Solomon Code) encoder 9. In the CIRC encoder 9, an error-correction coding process for adding parity data for error correction and a scrambling process are performed on the data supplied from the switching circuit 16. That is, 16 bits of one sample or one word are divided into high-order 8 bits and low-order 8 bits, each being formed as a symbol, and in units of this symbol, an error-correction coding process for adding parity data for error correction, for example, using CIRC, and a scrambling process are performed.

Subcodes of channels P and Q based on the current CD standard are supplied from an input terminal 7A. Subcodes of channels R to W, in which all the data is "0", are supplied from an input terminal 7B. Furthermore, the above-described special subcodes (≠0) are supplied as the subcodes of channels R to W from an input terminal 7C. The data supplied from the input terminals 7B and 7C is supplied to the corresponding input terminals of the switching circuit 17. Both of the terminals of the switching circuit 17 are switched at a predetermined timing under the control of an area control section 15 (to be described later).

The subcode data of the channels P and Q from the input terminal 7A and the subcode data of the channels R to W from the switching circuit 17 are supplied to a subcode encoder 10. The subcode encoder 10 converts the supplied subcode data of the channels P and Q and the channels R to W into subcodes having EFM frames of subcodes.

The output of the CIRC encoder 9 and the output of the subcode encoder 10 are supplied to a multiplexer 11. These signals supplied to the multiplexer 11 are arranged in a predetermined sequence and are output. The output data of the multiplexer 11 is supplied to the EFM modulator 12, whereby an 8-bit symbol is converted into a data symbol of 14 channel bits. Furthermore, the converted data, to which is added the frame sync signal supplied from a synchronization signal addition circuit 14 at a predetermined timing, is output from the EFM modulator 12.

In the EFM modulator 12, the DSV of the data symbol which is converted into 14 channel bits is detected. The detected DSV is supplied to the DSV control circuit 13. In the DSV control section 13, based on the supplied detection results of the DSV, connection bits of 3 bits that connect the data symbol to another data symbol are selected. In the EFM modulator 12, based on this selection result, the connection bits of 3 bits are added to the data symbol.

The DSV is a value such that the portion of the period of the channel clock at the higher level side after EFM is added as +1 and the portion of the period of the channel clock at the lower level side after EFM is added as −1. In the following, the fact that the summed value of the DSV increases in terms of an absolute value is assumed to be an increase of the DSV, and the fact that the DSV approaches 0 is assumed to be a decrease of the DSV.

For the connection bits, there are four types: "000", "001", "010", and "100". The selection of the connection bits is controlled so that a pattern of less than 3T or a pattern larger than 11T does not appear after the connection bits are inserted in accordance with the standard of the compact disc, and the DSV is converged.

The area control circuit 15 controls the switching of the switching circuit 17 so that a signal such that the special subcode supplied from the input terminal 7C is subjected to EFM, is recorded in a predetermined area of the subcode.

In the DSV control section 13, the switching of the switching circuit 16 is controlled in synchronization with the control of the switching circuit 17 by the area control section 15. As a result of the control of the switching circuit 17 by the area control section 15, the switching circuit 16 is controlled by the control of the DSV control section 13 so that special data having a specific pattern is supplied from the input terminal 6B in response to the supply of the special subcode from the input terminal 7C.

A recording signal of an EFM frame format of a CD is generated from the EFM modulator 12. This recording signal is supplied to the light modulator 2, and a photoresist on the glass master 4 is exposed by the modulated laser beam from the light modulator 2. The glass master 4 on which recording is performed in this manner is developed, and an electroforming process is performed thereon, thereby manufacturing a metal mask, and then a mother disc is manufactured from the metal mask. Next, a stamper is manufactured from the mother disc. By using the stamper, a disc substrate having light transmissivity is manufactured by a method such as compression molding, injection molding, etc. A reflective layer is formed on this disc substrate by coating a metal such as Al, Au, or Ag, by deposition or sputtering, and a protective layer is formed on the reflective layer, thereby forming an optical disc.

Figure 5:
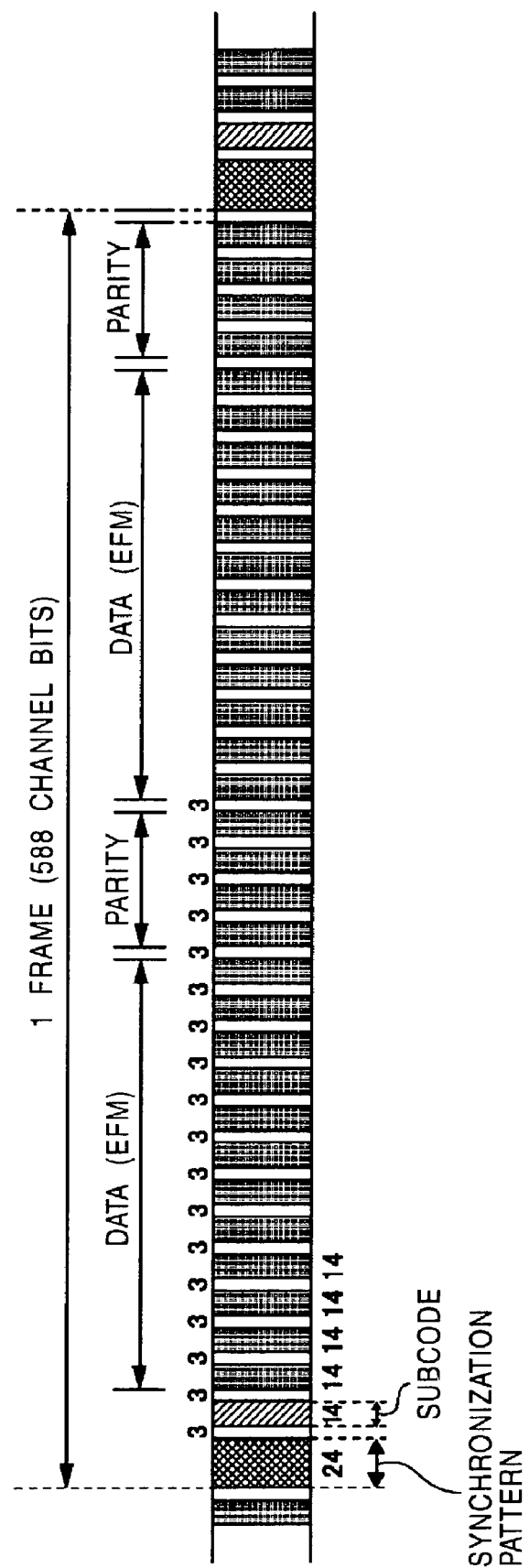
FIG. 5 shows the data structure of one EFM frame of a CD.

FIG. 5 shows the data structure of one EFM frame of a CD. In the CD, a parity Q and a parity P, each being formed of four symbols, are formed from a total of 12 samples (24 symbols) of digital audio data of two channels. 33 symbols (264 data bits) such that one symbol of a subcode is added to the total of 32 symbols is handled as one cluster. That is, within one frame after EFM modulation, 33 symbols composed of a subcode of one symbol, data of 24 symbols, a parity Q of 4 symbols, and a parity P of 4 symbols are contained.

In the EFM (Eight to Fourteenth Modulation) modulation method, each symbol (8 data bits) is converted into 14 channel bits. The minimum time width (the time width during which the number of 0s between two 1s of the recording signal becomes a minimum) $T_{min}$ of EFM modulation is 3T, and the pit length corresponding to 3T is 0.87 μm. The pit length corresponding to T is a minimum pit length. Connection bits of three bits are located between two 14 channel bits. Furthermore, a frame sync pattern is added at the start of the frame. The frame sync pattern is formed as a pattern in which, when the period of the channel bits is denoted as T, 11T, 1T, and 2T are consecutive. Since such a pattern will not occur in the EFM modulation rule, a unique pattern enables a frame sync to be detected. One EFM frame is composed of a total number of 588 channel bits. The frame frequency is set at 7.35 kHz.

A collection of 98 such EFM frames is called a "subcode frame (or a subcode block)". The subcode frame in which 98 frames are shown by being rearranged in such a manner as to be consecutive in the vertical direction is formed of a frame synchronization part for identifying the start of the subcode frame, a subcode part, and data and parity parts. This subcode frame corresponds to 1/75 seconds of the normal CD playback time.

Figure 6:
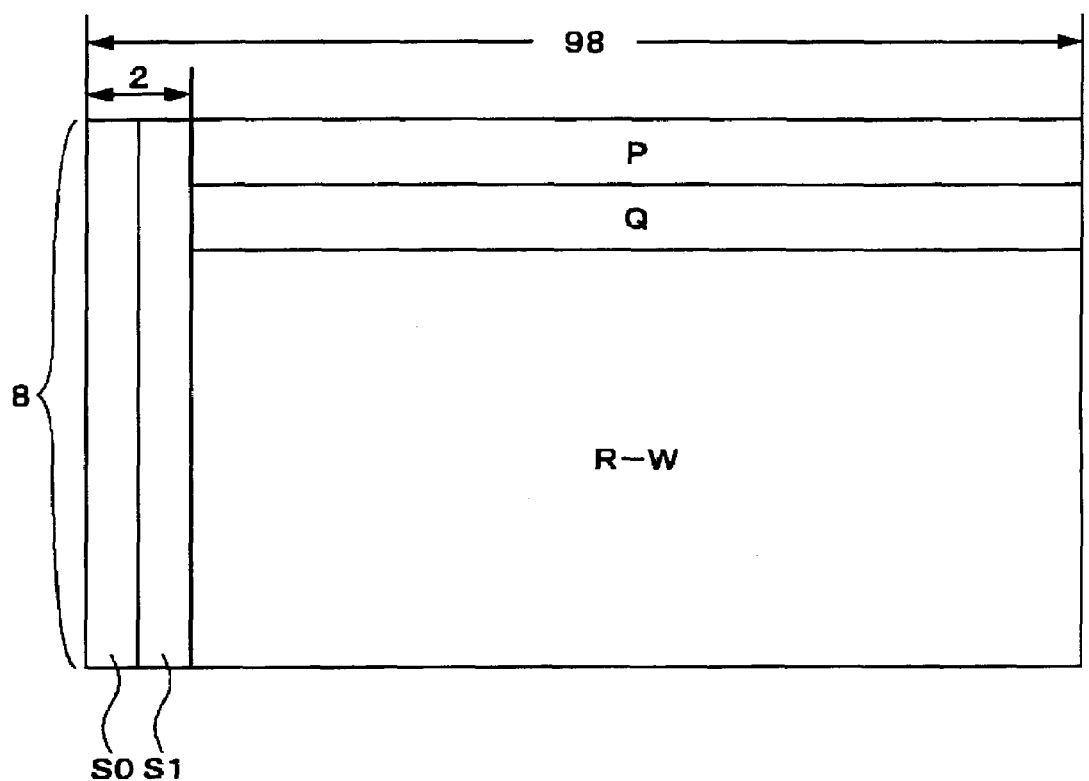
FIG. 6 shows the data structure of a subcode part.

FIG. 6 shows the data structure of the subcode part. The subcode part is formed of 98 EFM frames. The two beginning frames in the subcode part are a synchronization pattern for the subcode frame and a pattern for an out of rule of EFM. Each bit in the subcode part forms a P, Q, R, S, T, U, V, or W channel. The eight bits made up of the P to W channels of this subcode part is called a "subcode byte".

The P channel and the Q channel are used for the track position control operation of the optical pickup when the digital data recorded on a disc is played back.

The P channel is used to record a signal "0" in a so-called lead-in area which is positioned in the inner region of the disc, and is used to record a signal in which "0" and "1" are repeated at a predetermined period in a so-called lead-out area which is positioned in the outer region of the disc. Furthermore, in a program area positioned between the lead-in area and the lead-out area of the disc, the P channel is used to record a signal "1" in a pause period between musical pieces and to record signal "0" in the other periods so as to find the beginning of each musical piece during the playback of the digital audio data recorded on the CD. That is, in the P channel of the program area, "0" is recorded in periods other than in the pause period.

The Q channel is provided to enable more precise control during playback of the digital audio data recorded on the CD, and time information for musical pieces, etc., is recorded therein. Therefore, the bit recorded in the Q channel is "0" or "1". The structure of one subcode frame of the Q channel is formed of a synchronization bit part, a control bit part, an address bit part, a data bit part, and a CRC (Cyclic Redundancy Check) bit part.

The R to W channels are used for special applications, such as a display of still images and characters of so-called Karaoke (sing-along), in a standard called CD-G (CD-Graphic) among CD standards. In a standard-mode CD other than this CD-G and the standard called "CD-Text", in which text data can be embedded in a CD, for example, an ordinary CD-DA and CD-ROM, these subcode R to W channels are not used, and "0" is recorded in each bit of the R to W channels.

Figure 7:
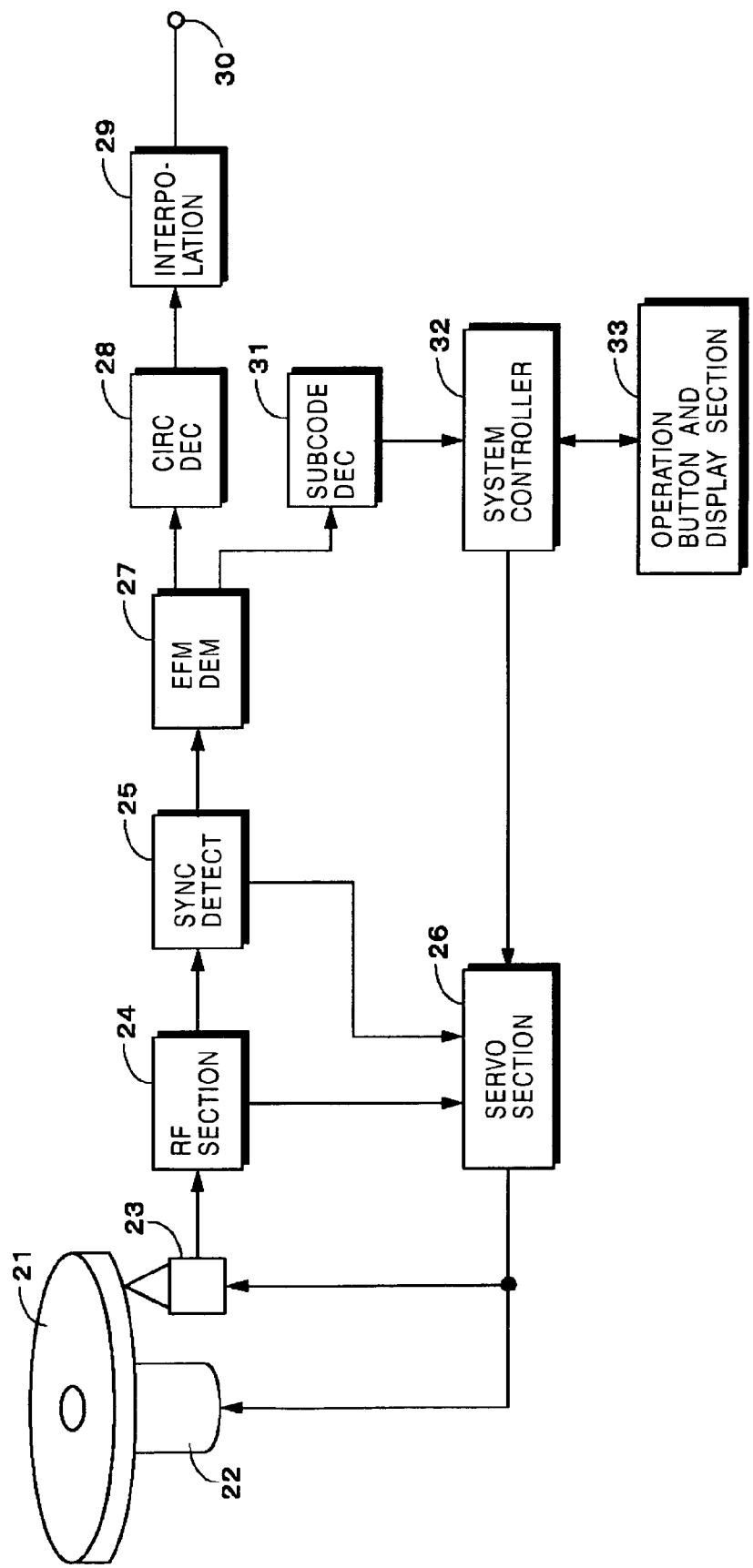
FIG. 7 is a block diagram showing an example of the configuration of a playback apparatus for playing back an optical disc.

FIG. 7 shows an example of the configuration of a playback apparatus for playing back an optical disc manufactured by the above-described mastering and stamping. Although the playback apparatus has the same configuration as that of a conventional player and drive, the playback apparatus will be described below for the reference for the understanding of the present invention.

In FIG. 7, a disc 21 manufactured in the above-described mastering and stamping steps is rotated by a spindle motor 22, and a signal recorded on the disc 21 is played back by an optical pickup 23. The optical pickup 23 is formed of a semiconductor laser for irradiating the disc 21 with laser light, an optical system such as an objective lens, a detector for photoreceiving return light from the disc 21, focusing and tracking mechanisms, etc. Furthermore, the optical pickup 23 is fed in the radial direction of the disc 21 by means of a sled mechanism (not shown).

An output signal from, for example, a detector having four divided portions of the optical pickup 23 is supplied to an RF section 24. The RF section 24 performs operations on the output signal of each detector of the four divided portions, thereby generating a playback (RF) signal, a focus error signal, and a tracking error signal. The playback signal is supplied to a sync detection section 25. The sync detection section 25 detects a frame sync added to the start of each EFM frame. The detected frame sync, focus error signal, and tracking error signal are supplied to a servo section 26. The servo section 26 controls the rotation operation of the spindle motor 22 and controls focus servo and tracking servo of the optical pickup 23 in accordance with the playback clock of the RF signal.

Main data output from the frame sync detection section 25 is supplied to an EFM demodulator 27, whereby the main data undergoes an EFM demodulation process. The main digital data from the EFM demodulator 27 is supplied to a CTRC decoder 28, whereby the main digital data undergoes an error correction process. Furthermore, the data output from the CIRC decoder 28 is interpolated by an interpolation circuit 29, and the data is extracted as playback data at an output terminal 30. The subcode data from the EFM demodulator 27 is supplied to a system controller 32.

The system controller 32, formed of a microcomputer, controls the operation of the entire playback apparatus. An operation button and display section 33 is provided in association with the system controller 32. The system controller 32 controls the sled mechanism and the servo section 26 so as to access a desired position of the disc 21.

FIGS. 8 to 13 show conversion tables for converting data bits of 8 bits (referred to as a "data symbol" as appropriate) into channel bits of 14 bits (referred to as a "code symbol" as appropriate) in the EFM modulator 12. In FIGS. 8 to 13, data bits are shown in a hexadecimal notation (00 h to FFh), a decimal notation (0 to 255), and a binary notation. "1" in the 14 bits of the code symbol indicates the position at which the value is inverted. Since the data symbol is 8 bits long, 256 patterns of the code symbol exist.

All the code symbols of 14 bits satisfy the EFM rule in which the minimum time width (the time width during which the number of 0s between two 1s of the recording signal becomes a minimum) is 3T, that is, the number of 0s between two 1s is 2 and in which the maximum time width (the time width during which the number of 0s between two 1s of the recording signal becomes a maximum) is 11T, that is, the number of 0s between two 1s is equal to or less than 10. Hereinafter, the EFM rule will be referred to as a "run-length limit condition" where appropriate.

Even when two code symbols of 14 bits are connected to each other, connection bits are necessary to satisfy the above-described run-length limit conditions $T_{min}$=3T and $T_{max}$=11T. As connection bits, four kinds of patterns of "000", "001", "010", and "100" are provided. An example in which connection bits are used to connect two 14 bits will now be described with reference to FIG. 14. The example described below is described in "KONPAKUTO DISSUKU DOKUHON (Compact Disc Reader)" (Revised 3rd Edition) (Mar. 25, 2001, Published by Ohm Co., Ltd.).

Figure 14:
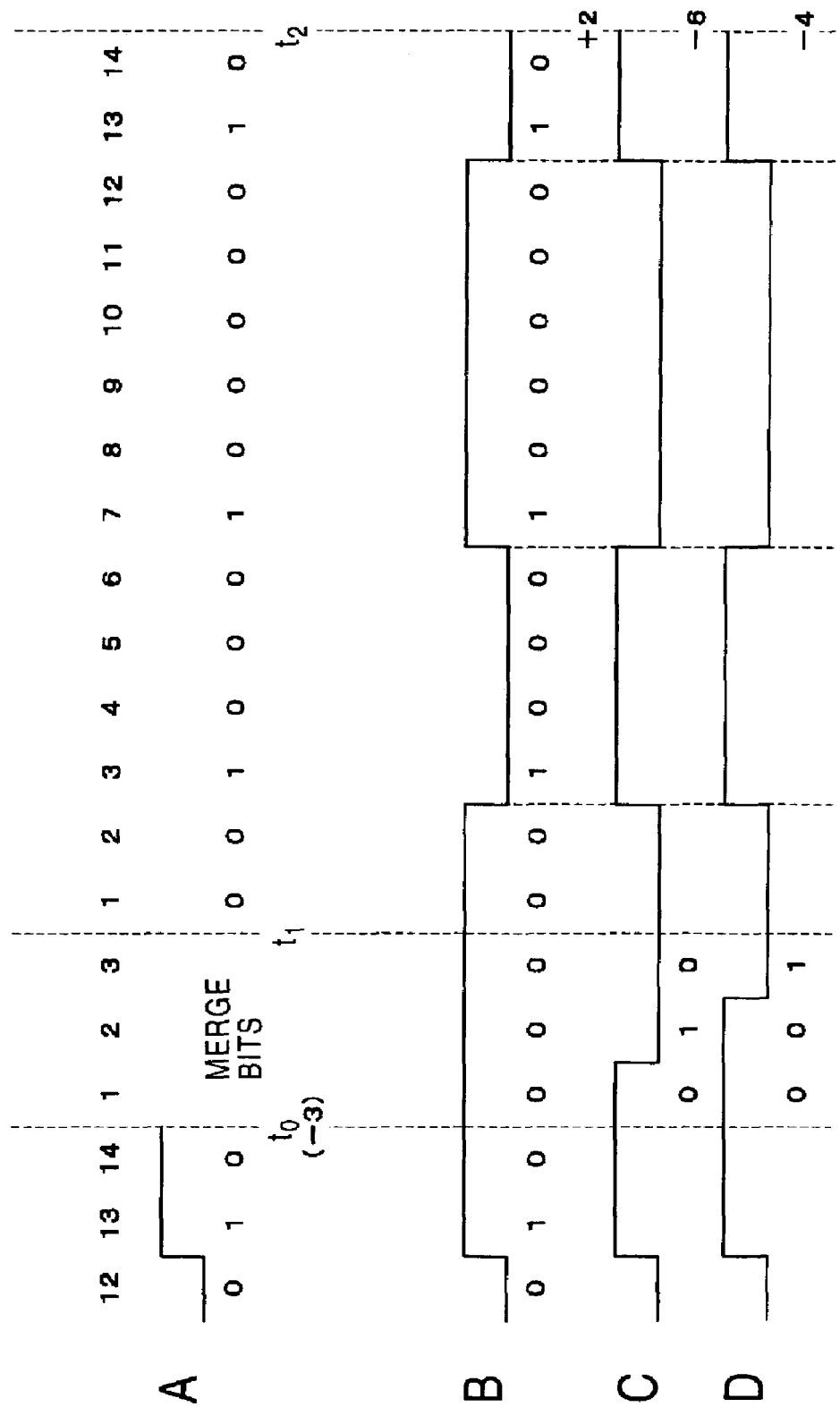
FIG. 14 illustrates a method of selecting connection bits.

A case in which, as shown in FIG. 14, the pattern of the leading 14 bits ends at "010" and the next data symbol is "01110111" (77 h in the hexadecimal notation, and 119 in the decimal representation) will now be described below. This data symbol is converted into a pattern "00100010000010" of 14 bits. The pattern of the preceding 14 bits ends at timing to, the pattern of the next 14 bits starts at a timing $t_1$ after the interval of the connection bits, and the pattern of the next 14 bits ends at timing $t_2$.

When "100" is used as one of the four types of connection bits, since the condition $T_{min}$=3T is not satisfied, these connection bits are not used. The rest three connection bits can be used. As the connection bits which are actually used among the three connection bits, connection bits which cause the DSV to be decreased are selected. The DSV is determined by providing +1 thereto when the waveform is at a high level and by providing −1 thereto when the waveform is at a low level. As one example, it is assumed that the DSV at timing to is −3.

Part B of FIG. 14 shows the waveform when "000" is used as the connection bits. Since the DSV in a period ($t_0$-$t_1$) is +3 and the DSV in a period ($t_1$-$t_2$) is +2, the DSV at timing $t_2$ is (−3+3+2=+2). Part C of FIG. 14 shows the waveform when "010" is used as the connection bits. Since the DSV in a period ($t_0$-$t_1$) is −1 and the DSV in a period ($t_1$-$t_2$) is −2, the DSV at timing $t_2$ is (−3−1−2=−6). Part D of FIG. 14 shows the waveform when "001" is used as the connection bit. Since the DSV in a period ($t_0$-$t_1$) is +1 and the DSV in a period ($t_1$-$t_2$) is −2, the DSV at timing $t_2$ is (−3+1−2=−4). After all, the connection bits "000" in which the DSV at timing $t_2$ is closest to 0 are selected.

The connection-bit selection section is provided inside the EFM modulator 12 shown in FIG. 4. As described above, the connection-bit selection section selects connection bits which satisfy $T_{min}$=3T and $T_{max}$=11T, which are run-length limit conditions for EFM modulation, and selects connection bits among the above connection bits, which cause the DSV to be converged.

Figure 15:
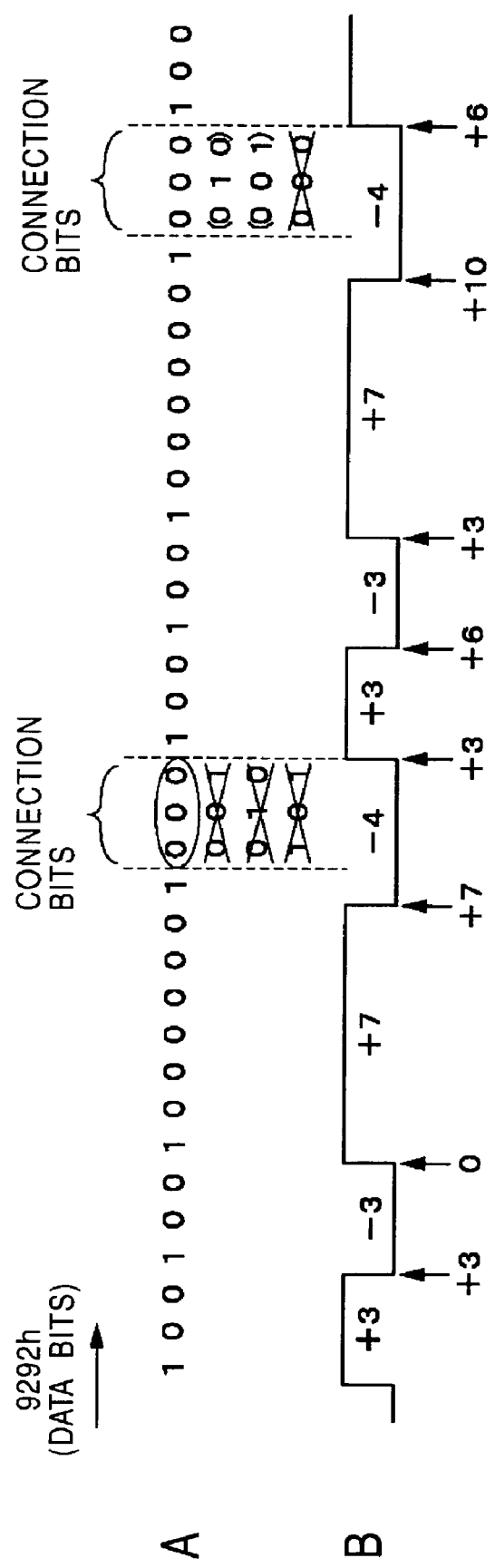
FIG. 15 shows a DSV and a portion of a waveform when EFM is performed using a repetition pattern of "92h" as special data.

In an embodiment of the present invention, special data having a specific data pattern by which connection bits can be determined only uniquely as input data will now be described below. As an example of such special data, there is a repetition pattern of data "92h". Parts A and B of FIG. 15 show a DSV and a portion of the waveform when EFM is performed using a repetition pattern of "92h" as special data. "h" indicates that the representation is in a hexadecimal notation.

With reference to FIGS. 8 to 13, the code symbol in which "92h" is converted is "10010010000001". When this code symbol is consecutive, for the connection bits to be inserted, only the connection bits "000" can be selected in accordance with the run-length limit conditions $T_{max}$=11T and $T_{min}$=3T (see part A of FIG. 15). That is, any one of the connection bits "001", "010", and "100" cannot satisfy the condition $T_{min}$=3T.

When the special data "92h" is consecutive, the connection bits are uniquely selected in this manner, and the recording signal is output. At this time, since control by the connection bits cannot be performed, the DSV is determined by the pattern of the original code symbol. When the waveform based on the pattern by "92h", that is, the code symbol "10010010000001", is repeated, the summed value of the DSV continues to increase, as shown in part B of FIG. 15, and, for example, the summed value of the DSV is increased by 100 or more per EFM frame.

In the example shown in part B of FIG. 15, the summed value of the DSV at the end position of the first connection bits is +3, the summed value of the DSV at the end position of the next connection bits is +6, and it can be seen that the summed value of the DSV increases by +3 with the code symbol and the connection bits being the period. The DSV continues to increase while this pattern of "92h" is repeated.

When this pattern of "92h" ends and the data becomes random data by, for example, PCM data, in order to make the increased DSV approach 0, connection bits which cause the DSV to be decreased are selected, and the DSV is decreased suddenly.

In an ordinary CD playback apparatus, when the summed value of the DSV exceeds 50, the playback apparatus cannot follow the playback signal, and there is a risk in that the playback operation may fail. Also, when the DSV is decreased suddenly, the playback operation may fail.

A description will now be given of a subcode byte. As described above, in a subcode byte composed of 8 bits of P to W channels, the P channel is set at "0" in periods other than the pause period, the Q channel is set at "0" or "1" since time information, etc., is recorded, and the R to W channels are set at "0" in a disc of a standard other than CD-G or CD-Text. Consequently, in general, the subcode byte is "00000000" or "01000000" in a binary notation, that is, "00h" or "40h". When the data "00h" and "40h" are converted into code symbols, they become "01001000100000" and "01001000100100", respectively.

In the data "00h" and "40h", when the data which follows the above data is "9Dh" or "9Eh" at "00h" and "95h" or "B5h" at "40h", a non-inversion pattern such as "000", which does not cause the waveform by the code symbol which follows to be inverted, cannot be selected as the connection bits due to the limitation of $T_{max}$=1T. That is, in these cases, an inversion pattern "100", "010", or "001", which causes the waveform by the code symbol which follows to be inverted, is selected forcedly, and the DSV cannot be controlled.

More specifically, referring to FIGS. 8 to 13, it can be seen that the data "9Dh" and "9Eh" are converted into the code symbols shown below.

"9Dh"="00001000000001"
"9Eh"="00010000000001"

In contrast, if the subcode byte is "00h", the code symbol such that "00h" is converted is "01001000100000". Therefore, if "000" is selected as the connection bits, 11 or more 0s continue, and $T_{max}$=11T cannot be satisfied. Therefore, here, one of "001", "010", and "100" is selected as the connection bits. Furthermore, the ends of the code symbols of "9Dh" and "9Eh" are "1" in the manner described above, and when the data "92h" whose start of the code symbol is "1" follows that end, "000" is uniquely selected as the connection bits on the basis of $T_{min}$=3T. Therefore, control of the DSV by the connection bits cannot be performed.

The repetition of the data "9Dh", "9Eh", and "92h", which follows the subcode byte, may be added in units of one EFM frame.

The same applies to the case of the subcode byte "40h" and the data "95h" or "B5h". It can be seen with reference to FIGS. 8 to 13 that the data "95h" and "B5h" are converted into the code symbols shown below.

"95h"="00000010000001"
"B5h"="00000010001001"

Since the code symbol such that the subcode byte "40h" is converted is "01001000100100", if "000" is selected as the connection bits, 11 or more 0s continue, and $T_{max}$=11 cannot be satisfied. Therefore, here, one of "001", "010", and "100" is selected as the connection bits. Furthermore, the ends of the code symbols of the data "95h" and "B5h" are "1" in the manner described above, and when the data "92h" whose start of the code symbol is "1" follows that end, "000" is uniquely selected as the connection bits on the basis of $T_{min}$=3. Therefore, control of the DSV by the connection bits cannot be performed.

A description will now be given of a case in which another value in place of the above-described "00h" and "40h" is used. Channels other than the subcode channels P and Q are not generally used in the manner described above. For this reason, even if the values of the channels R to W other than the channels P to Q differ from the values (=0) to which "00h" and "40h" correspond, the possibility that a problem will occur in an ordinary CD playback apparatus is small.

A case in which "24h" or "3Fh" is used in place of "00h" will be described first. Referring to FIGS. 8 to 13, it can be seen that "24h" and "3Fh" are converted into the code symbols shown below, respectively.

"24h"="01000100001000"
"3Fh"="00100000001000"

When the above-described data "9Dh" or "9Eh" follows the subcode byte "24h" or "3Fh", for the connection bits for the data, all the inversion/non-inversion patterns, that is, all of "000", "001", "010", and "100", can be selected. As a result, control of the DSV by the inversion/non-inversion of the waveform becomes possible.

In both "24h" and "3Fh", three 0s are consecutively located following "1" at the end side of the converted code symbol, and in "9Dh" and "9Eh", "1" is located after four and three 0s continue from the start of the converted code symbol, respectively. Therefore, even if "000" is selected as the connection bits, 11 or more 0s do not continue, and the run-length limit condition $T_{max}$=11 is satisfied. Furthermore, even if any one of "001", "010", and "100" is selected as the connection bit, the number of consecutive 0s is 2 or more, and the run-length limit condition $T_{min}$=3 is satisfied.

Next, a case in which "74h" or "7Fh" is used in place of "40h" will now be described. Referring to FIGS. 8 to 13, it can be seen that "74h" and "7Fh" are converted into the code symbols shown below, respectively.

"74h"="01000010000010"
"7Fh"="00100000000010"

When the data "95h" or "B5h" described above continues after the subcode byte "74h" or "7Fh", for the connection bits for the data, one of "000", "001", and "010" can be selected, both the inversion/non-inversion patterns of the waveform can be selected as appropriate, and thus control of the DSV by the inversion/non-inversion of the waveform becomes possible.

In both "74h" and "7Fh", one "0" is located following "1" at the end of the converted code symbol, and in "95h" and "B5h", "1" is located after six 0s continue from the start of the converted code symbol. Therefore, even when "000" is selected as the connection bits, 11 or more 0s do not continue, and the run-length limit condition $T_{max}=11$ is satisfied. Furthermore, even if either one of "001" and "010" is selected as the connection bits, the number of consecutive 0s is 2 or more, and thus the run-length limit condition $T_{min}=3$ is satisfied.

In this manner, a CD is manufactured using a recording signal in which the pattern is repeated in which "24h" and "3Fh", or "74h" and "7Fh" are used as the subcode bytes; as the data which follows the subcode byte, for example, data "9Dh" or "9Eh" is used when the subcode byte is "24h" or "3Fh", and data "95h" or "B5h" is used when the subcode byte is "74h" or "7Fh"; and as the data which follows further, data "92h" is used.

At this time, the connection bits that connect "24h" and "3Fh", or "74h" and "7Fh" as the subcode bytes to the data "9Dh" and "9Eh", or the data "95h" and "B5h", which follows the subcode byte, can be selected from among the inversion/non-inversion patterns and can be used in the manner described above. Therefore, by selecting the connection bits as appropriate, the DSV after that can be led in a preferable direction.

In a case where the CD manufactured in this manner is copied using, for example, a CD-R disc, in an ordinary copying tool, even if values other than 0 are stored in the subcode R to W channels, which are not used in an ordinary CD and CD-ROM disc, those values are changed to "0". That is, in an ordinary copying tool, the values of the channels R to W among the subcode bytes are changed to "0".

Then, as described above, in the connection bits between the subcode byte and the data "9Dh" or "9Eh", and between the subcode byte and the data "95h" or "B5h", which follows the subcode byte, an inversion pattern of "001", "010", or "100" is forcedly selected, and in the pattern in which the data "92h" which follows that inversion pattern is repeated, the connection bits are forcedly set to "000".

When the disc manufactured in this manner is played back by an ordinary CD playback apparatus or a CD-ROM drive, the DSV cannot be controlled in a portion in which a specific data pattern (in which data "92h" is repeated) is inserted, the summed value of the DSV continues to increase, and the summed value of the DSV decreases suddenly after that portion ends. In general, when a playback is performed using a playback apparatus for playing back a CD, the variations in the DSV affect asymmetry correction, etc. In a disc in which a pattern using the data "92h" is recorded as described above, an influence to a such degree that the original data cannot be played back is confirmed.

Therefore, when a CD-R disc manufactured in this manner is played back using an ordinary CD playback apparatus, the summed value of the DSV continues to increase, and the playback operation fails. That is, as a result, a disc, which is manufactured in such a manner that a special subcode, special data, or a specific data pattern is inserted, according to the present invention cannot be copied using a CD-R disc or a CD-RW disc.

Figure 16:
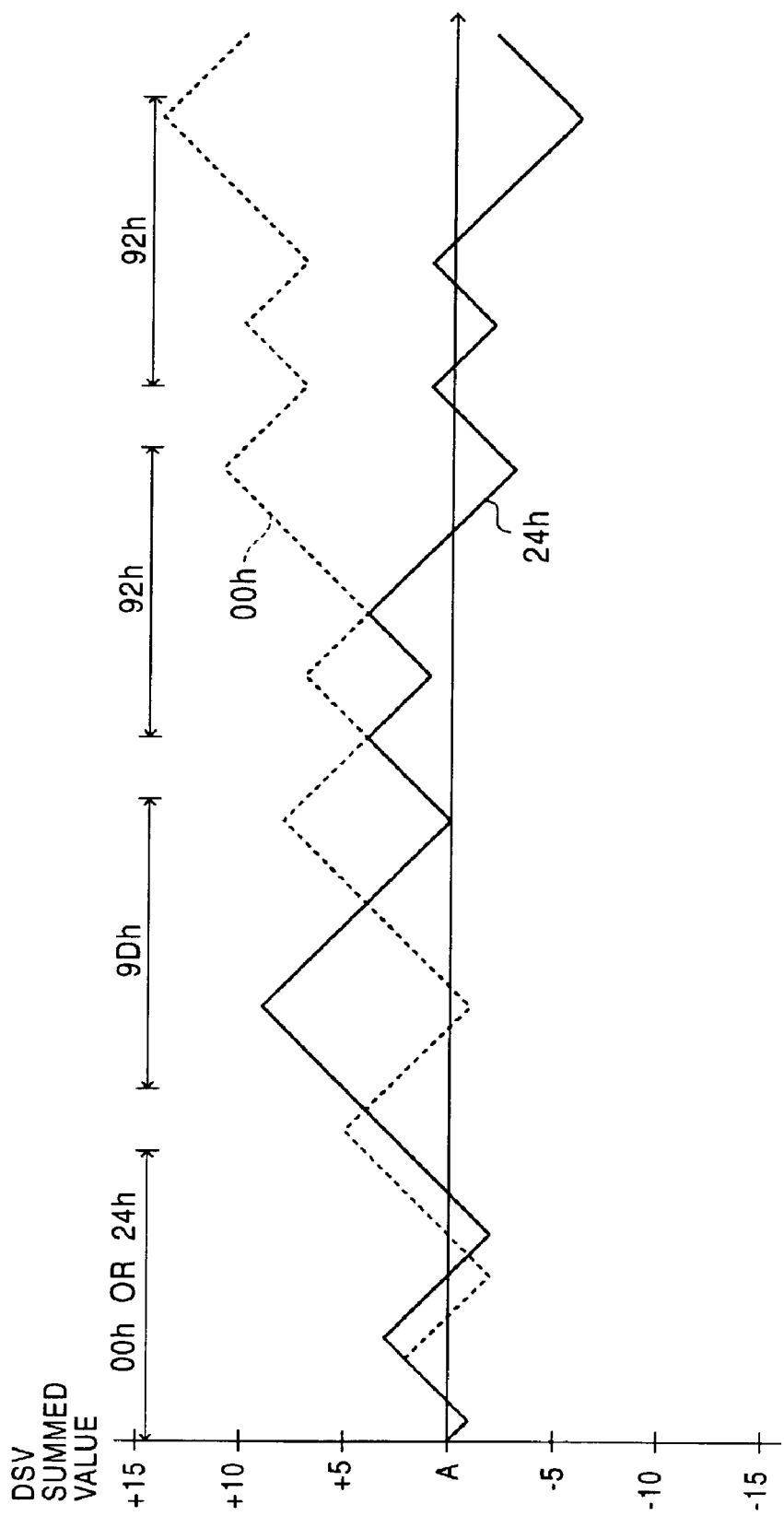
FIG. 16 shows variations of an example of a DSV summed value.

The above case will now be described in more detail with reference to FIG. 16. FIG. 16 shows variations of an example of the summed value of the DSV. The vertical axis shows the summed value of the DSV with respect to the initial value A. In FIG. 16, an example of variations of the summed value of the DSV when "00h" is used as the subcode byte and "9Dh" is used as the data which follows the subcode byte is indicated by the dotted line. Furthermore, in FIG. 16, an example of variations of the summed value of the DSV when "24h" is used as the subcode byte and "9Dh" is used as the data which follows the subcode byte is indicated by the solid line.

When "00h" is used as the subcode byte, the connection bits between the subcode byte and the data "9Dh" which follows the subcode byte can be selected only from among the inversion patterns. In the example of FIG. 16, "010" is selected as the connection bits. For this reason, the DSV cannot be controlled, and the summed value of the DSV continues to increase in the repetition of the data "92h" which follows the data "9Dh".

In contrast, when "24h" is used as the subcode byte, the connection bits between the subcode byte and the data "9Dh" which follows the subcode byte can be selected as desired from four types of data patterns. Therefore, as shown in FIG. 16, it is possible to control the DSV so that the summed value of the DSV varies in a direction in which it decreases after the data "9Dh", that is, in the repetition of the data "92h".

A description will now be given below of a case in which, as an example, the initial value A is a predetermined value in a direction in which the summed value of the DSV increases. For example, it is assumed that the initial value A is +40. In this case, if "00h" is used as the subcode byte, the summed value of the DSV already becomes +50 at the right end of FIG. 16. In the repetition pattern of the data "92h", since the summed value of the DSV continues to increase, if the data "92h" is further repeated, there is a risk in that the playback operation may fail in an ordinary CD playback apparatus.

On the other hand, when "24h" is used as the subcode byte, by appropriately selecting the connection bits between the subcode byte and the data "9Dh" which follows the subcode byte, the summed value of the DSV can vary in a direction in which it decreases in the repetition pattern of the data "92h". In the example of FIG. 16, the summed value of the DSV becomes +38 at the right end of FIG. 16. In this case, since the summed value of the DSV varies further in a direction in which it decreases due to the repetition of the data "92h", there is a considerable allowance with respect to time until the summed value of the DSV becomes a value to such a degree that the playback operation fails in an ordinary CD playback apparatus.

The selection of the connection bits is made by the DSV control section 13 under the control of the switching circuit 16 by the DSV control section 13 and under the control of the switching circuit 17 by the control section 15 synchronized with the DSV control section 13.

More specifically, for example, when special data such as the data "92h" is inserted as recording data of a particular EFM frame, the switching circuit 16 is controlled in accordance with an area control signal from the control section 15 so that special subcode data (for example, "24h") in place of the standard subcode data is input as the subcode data of that EFM frame. Furthermore, the switching circuit 17 is controlled in accordance with a control signal from the DSV control section 13 so that special data ("9Dh" or "92h" in the above-described example) in place of the main data is input.

At this time, control is performed so that special data in accordance with the special subcode data which is input under the control of the area control section 15 is input.

The special subcode data and the special data undergo predetermined processes in the subcode encoder 10 and the CIRC encoder 9, respectively, and the multiplexer 11 arranges the data in a predetermined sequence, and supplies the data, to which a synchronization signal is added, to the EFM modulator 12. In the EFM modulator 12, EFM is performed on the supplied data, and the supplied data is converted into a code symbol. At this time, one of the four types of connection bits is selected as appropriate so that the summed value of the DSV decreases, and the connection bits are inserted between the code symbol and another code symbol.

In the foregoing, a description has been given by assuming that "24h" and "3Fh", and "74h" and "7Fh" are used as special subcode data in place of the standard subcode bytes "00h" and "40h". This special subcode data is not limited to this example, and other data may be used. Although the special data such that the summed value of the DSV increases in one direction has been described as "92h", this special data is not limited to this example. Similarly, although the data inserted between the special data "92h" and the subcode byte has been described as "9Dh" and "9Eh", and "95h" and "B5h", this data is not limited to this example. Other data may be used as long as the data satisfies a predetermined condition which has already been described.

The present invention is not limited to the above-described embodiments, and various modifications and applications are possible within the spirit and scope of the present invention. For example, the present invention can be applied to EFM Plus as a modulation method other than EFM. In EFM Plus, an 8-bit data symbol is converted into a 16-bit code symbol, and connection bits are not used. Also, in the case of EFM Plus, a specific data pattern in which the DSV increases in terms of an absolute value exists. Therefore, by using an encoder in which a standard code conversion table is altered, even specific data pattern can prevent an increase of the DSV. This makes it possible to determine whether the disc is an original disc manufactured using the encoder to which the present invention is applied or is a copied disc manufactured using a conventional encoder.

The present invention can be applied to, for example, multi-session optical discs for recording data of a CD-DA format and data of a CD-ROM format. The information to be recorded on the optical disc may be various types of data, such as audio data, video data, still image data, character data, computer graphic data, game software, computer programs, etc. When the information to be recorded on the optical disc is video data or still image data, for example, data for performing a display closer to gray in a playback video and/or image can be used as special data. Therefore, the present invention can also be applied to, for example, DVD video discs and DVD-ROM discs. Furthermore, the present invention can be applied to card-shaped recording media in addition to disc-shaped recording media.

What is claimed is:

1. A recording method, comprising:
   generating recording data satisfying a predetermined run length limit condition by converting m-bit data into n-bit data symbols through a digital modulation, where m<n, and selecting bit patterns for connecting the n-bit data symbols from a plurality of predetermined bit patterns,
   adding, when said n-bit symbol is a special data symbol, connection bits from among a plurality of connection bits after said n-bit data symbol to create a summed value of digital sum variation DSV per unit time that does not exceed a predetermined range;
   adding, when said n-bit data symbol is a normal data symbol, said connection bits from among said plurality of connection bits are added after said n-bit data symbol to create said summed value of digital sum variation DSV per unit time that exceeds said predetermined range,
   wherein the predetermined range defines a threshold which, when exceeded by the summed value, disturbs normal reproduction of data; and
   recording said generated recording data on a recording medium.

2. The recording method according to claim 1, wherein, when main data and sub-data are to be recorded on said recording medium, said sub-data is converted into said special data symbol and is recorded.

3. The recording method according to claim 2, wherein the digital modulation method is a 8-14 modulation method.

4. The recording method according to claim 1, wherein, when said n-bit data symbol is a special data symbol, specific connection bits among said plurality of connection bits are added to generate recording data.

5. The recording method according to claim 1, wherein, when main data and sub-data are to be recorded on said recording medium, said sub-data is converted into said special data symbol and is recorded.

6. The recording method according to claim 5, wherein said m-bit data is converted into said recording data in accordance with an 8-14modulation method.

7. A recording method comprising the steps of:
   generating recording data by converting m-bit data into n-bit data symbols through using a digital modulation method, where m<n and the m-bit data includes subcode data;
   selecting connecting bits for connecting n-bit data symbols from a plurality of predetermined bit patterns;
   adding the connection bits selected in the selecting after a subcode n-bit data symbol to create a summed value of digital sum variation DSV per unit time that does not exceed a predetermined range when said subcode n-bit symbol is a special data symbol, the summed value exceeding said predetermined range when said subcode n-bit data symbol is a normal data symbol, the predetermined range defining a threshold which, when exceeded by the summed value, disturbs normal reproduction of data
   recording said generated recording data on a recording medium.

8. The recording method according to claim 7, wherein said m-bit data is converted into said recording data in accordance with an 8-14modulation method.

9. The recording method according to claim 7, wherein said m-bit data is converted into said n-bit data in accordance with an 8-16modulation method.

10. The recording method according to claim 7, wherein the subcode data is R-W subcode data.

11. The recording method according to claim 10, wherein the normal data symbol comprises null values and the special data symbol comprises non-null values.

12. A recording apparatus comprising:
   a generation section configured to generate recording data satisfying a predetermined run length limit condition by converting m-bit data into n-bit data symbols through a digital modulation, where m<n, and selecting bit patterns for connecting the n-bit data symbols from a plurality of predetermined bit patterns, connection bits from among a plurality of connection bits being added after said n-bit data symbol to create a summed value of digital sum variation DSV per unit time that does not exceed a predetermined range when said n-bit symbol is a special data symbol, connection bits from among said plurality of connection bits being added after said n-bit data symbol to create said summed value of digital sum variation DSV per unit time that exceeds said predetermined range when said n-bit data symbol is a normal data symbol, the predetermined range defines a threshold which, when exceeded by the summed value, disturbs normal reproduction of data; and a recording section configured to record said recording data generated by said generation section on a recording medium.

13. The recording apparatus according to claim 12, wherein, when main data and sub-data are to be recorded on said recording medium, said sub-data is supplied as said special data symbol to said generation section.

14. The recording apparatus according to claim 13, wherein said generation section converts said m-bit data into said recording data in accordance with an 8-14 modulation method.

15. The recording apparatus according to claim 12, wherein said generation section converts said m-bit data into said n-bit data in accordance with an 8-16 modulation method.

16. A computer readable storage medium encoded with computer program instructions that cause a computer to implement a method of recording, comprising:

recording data satisfying a predetermined run length limit condition is generated by converting m-bit data into n-bit data symbols through a digital modulation, where m<n, and selecting bit patterns for connecting the n-bit data symbols from a plurality of predetermined bit patterns, adding, when said n-bit symbol is a special data symbol, connection bits from among a plurality of connection bits after said n-bit data symbol to create a summed value of digital sum variation DSV per unit time that does not exceed a predetermined range;

adding, when said n-bit data symbol is a normal data symbol, said connection bits from among said plurality of connection bits are added after said n-bit data symbol to create said summed value of digital sum variation DSV per unit time that exceeds said predetermined range, wherein the predetermined range defines a threshold which, when exceeded by the summed value, disturbs normal reproduction of data.

17. The recording method according to claim 16, wherein main data and sub-data are recorded on said recording medium, and said sub-data is recorded as said special data symbol.

* * * * *

UNITED STATES PATENT AND TRADEMARK OFFICE
CERTIFICATE OF CORRECTION

PATENT NO. : 7,272,098 B2  Page 1 of 1
APPLICATION NO. : 10/436059
DATED : September 18, 2007
INVENTOR(S) : Yoichiro Sako et al.

It is certified that error appears in the above-identified patent and that said Letters Patent is hereby corrected as shown below:

Column 7, line 48, change "CTRC" to --CIRC--.

Column 9, line 55, change "$T_{max} = 1T$" to --$T_{max} = 11T$--.

Signed and Sealed this

Third Day of June, 2008

JON W. DUDAS
*Director of the United States Patent and Trademark Office*